United States Patent [19]
Price

[11] Patent Number: 5,826,339
[45] Date of Patent: Oct. 27, 1998

[54] FORESTRY CUTTING, MULCHING AND CLEARING TOOL

[76] Inventor: Douglas M. Price, P.O. Box 18052, Coffman Cove, Ak. 99918

[21] Appl. No.: 907,643

[22] Filed: Aug. 11, 1997

[51] Int. Cl.$^6$ .............................. B26B 1/00; A01G 23/07
[52] U.S. Cl. .......................... 30/134; 30/379; 144/34.1; 144/34.5; 144/335; 144/339; 144/4.1
[58] Field of Search .............................. 30/134, 228, 229, 30/379, 379.5, 180; 144/34.1, 34.5, 335, 339, 218, 4.1

[56] References Cited

U.S. PATENT DOCUMENTS

| | | |
|---|---|---|
| 3,719,314 | 3/1973 | Cox . |
| 3,886,984 | 6/1975 | Engel . |
| 4,274,457 | 6/1981 | Nilsen . |
| 4,452,286 | 6/1984 | Menzi . |
| 4,686,767 | 8/1987 | Ramun et al. .......................... 144/34.5 |
| 4,771,540 | 9/1988 | LaBounty ................................... 30/134 |
| 4,776,093 | 10/1988 | Gross ........................................ 30/134 |
| 5,080,151 | 1/1992 | Pallari ..................................... 144/34.5 |
| 5,378,852 | 1/1995 | Manor . |
| 5,579,816 | 12/1996 | Hill et al. . |
| 5,636,802 | 6/1997 | Tagawa ..................................... 30/134 |

FOREIGN PATENT DOCUMENTS

WO 93/03604   3/1993   WIPO .

*Primary Examiner*—W. Donald Bray
*Attorney, Agent, or Firm*—Richard C. Litman

[57] ABSTRACT

A forestry cutting, mulching and clearing attachment for a hydraulic excavator that is used for clearing sloped grounds, ditches, and culverts. The device includes two mating jaws which are substantially rectangular in shape and include a plurality of mating cutting surfaces. The clearing apparatus is designed to cut standing trees and brush using both longitudinally and laterally oriented cutting surfaces. In the preferred embodiment, the first jaw includes a curved blade and a pair of cutting blocks, while the second jaw includes a pair of curved blades and a cutting block. Each jaw has a pair of fixedly attached brackets which are used to pivotally mount the jaws to the boom structure of the hydraulic excavator. The jaws have a mutual pivoting point attached to the central boom of the excavator, and peripheral pivoting points movably attached to the control rams of the hydraulic cylinders. The hydraulic cylinders may be actuated to open and close the jaws in order to cut the debris into mulch. The jaws may be used to gather and remove the resulting mulch from drainage ditches by simply partially closing the jaws using enough force to grasp the mulch but not enough force to further cut the mulch.

20 Claims, 4 Drawing Sheets

FORESTRY CUTTING, MULCHING AND CLEARING TOOL

BACKGROUND OF THE INVENTION

1. Field of the Invention

The present invention relates generally to a tree and brush cutting, mulching, and clearing apparatus. More specifically, the present invention is a small tree and brush cutting attachment for a hydraulic excavator that is used for clearing sloped grounds, ditches, and culverts.

2. Description of the Related Art

Small trees and thick brush are constantly growing along the sides of roadways and train tracks, and in order to maintain the safety of such passageways this vegetation must be cleared every so often. However, the sloped grounds, ditches, and culverts along the sides of the passageways make clearing the vegetative growth difficult. Also the presence of rocks or stumps along the sides of roads can cause costly damage to many conventional tree and brush clearing devices which use rotating blades or cutters. Not only is it costly to replace broken or worn blades, but the down time of the clearing device is costly and inefficient.

In most instances conventional clearing devices leave large pieces of debris in the road and in ditches causing drainage problems and requiring additional work. Also many conventional clearing devices throw the debris over a wide area, which makes gathering and disposal of the debris difficult and time consuming. The end result of conventional debris clearing devices are aesthetically unpleasant slopes and ditches with ragged stumps cut high off the ground, and drainage ditches and culverts plugged with large and small pieces of debris.

Consequently there is a need for a tree and brush clearing device capable of operating well on uneven, broken ground. The clearing device should be capable of cutting the brush and trees into small pieces enabling the operator to leave a finished project that will not require further cleanup or fill drainage ditches with debris. The small pieces of brush and trees will then decompose quicker than would large logs typically left by conventional clearing devices. The clearing device should be efficient to operate and inexpensive to maintain and the cutting portion of the device should not be susceptible to damage by rocks or other hard objects. The clearing device should give the operator control of where to place the debris.

The following are examples of clearing devices, none of which accomplish the goals described above, as does the present invention.

U.S. Pat. No. 3,719,314, issued on Mar. 6, 1973, to Ernest P. Cox describes an apparatus for breaking logging slash and other waste into small sections. The apparatus includes three jaws rigidly fixed to and equidistantly spaced upon a frame, and two opposing jaws pivotally mounted on the frame and interspersed between the three fixed jaws. The pivoting is accomplished by using either a cable-operated or hydraulically-operated logging machine. The patent to Cox describes an apparatus specifically designed to break pre-cut logs into small pieces, and does not describe an apparatus designed to cut standing trees and brush using both longitudinally and laterally oriented cutting surfaces.

U.S. Pat. No. 3,886,984, issued on Jun. 3, 1975, to Henry L. Engel describes a tree-harvester shear assembly with fixed and movable blades, which shear assembly includes a mechanism for gripping and axially moving a tree relative to the shear assembly, and which mechanism has a movable blade pivoted relative to the shear frame. The patent to Engel does not describe a clearing device capable of cutting the brush and trees into small pieces using both longitudinally and laterally oriented cutting surfaces and enabling the operator to leave a finished project that will not require further cleanup or leave debris which can fill drainage ditches.

U.S. Pat. No. 4,274,457, issued on Jun. 23, 1981, to Christopher Nilsen describes a tree shear blade structure which includes hydraulically driven pivotally mounted shears and grapple arms. The patent to Nilsen does not describe a clearing device capable of cutting the brush and trees into small pieces using both longitudinally and laterally oriented cutting surfaces and enabling the operator to leave a finished project that will not require further cleanup or leave debris to fill drainage ditches.

U.S. Pat. No. 4,452,286, issued on Jun. 5, 1984, to Ernst Menzi describes an apparatus for cutting tree parts adapted to be operatively mounted on vehicles, and includes a pivotable holding arm and a pivotally mounted cutter plate of a planar configuration. The patent to Menzi does not describe a clearing device capable of cutting the brush and trees into small pieces using a plurality of both longitudinally and laterally oriented cutting surfaces and enabling the operator to leave a finished project that will not require further cleanup or leave debris to fill drainage ditches.

U.S. Pat. No. 5,378,852, issued on Jan. 3, 1995, to Gedalyahu Manor describes a tree and brush clearing attachment for a tractor. The clearing attachment includes a rotary cutter with blades pivotally mounted on a rotating shaft and enclosed in a cutter housing which is capable of both angular and rotational adjustment when mounted on a multi-section hydraulic arm. The patent to Manor does not describe a clearing device that is efficient to operate and inexpensive to maintain due to the fact that the cutting portion of the device is susceptible to damage by rocks or other hard objects. The clearing device described in the patent to Manor does not give the operator control of where to place the debris, otherwise enabling an operator to leave a finished project that will not require further cleanup or fill drainage ditches with debris.

U.S. Pat. No. 5,579,816, issued on Dec. 3, 1996, to Terrence R. Hill et al. describes a boom-mounted grappling and manipulating apparatus including a rotatably mounted articulated boom with a head rotatably and pivotally mounted thereto. The head is provided with opposable jaws that are hydraulically actuated. The patent to Hill et al. does not describe a clearing device capable of cutting the brush and trees into small pieces using both longitudinally and laterally oriented cutting surfaces. The patent to Hill et al. also does not describe a clearing device that enables the operator to leave a finished project that will not require further cleanup or fill drainage ditches with debris.

PCT International Publication Number WO 93/03604, published on Mar. 4, 1993, describes a felling, delimbing and cutting grapple for a multi-function tree harvester. The clearing device described in the PCT patent publication does not give the operator control of where to place the debris, otherwise enabling the operator to leave a finished project that will not require further cleanup or fill drainage ditches with debris.

None of the above inventions and patents, taken either singularly or in combination, is seen to describe the instant invention as claimed. Thus a forestry cutting and mulching tool solving the aforementioned problems is desired.

SUMMARY OF THE INVENTION

The present invention relates generally to a tree and brush clearing apparatus. More specifically, the present invention is a small tree and brush cutting attachment for a hydraulic excavator that is used for clearing sloped grounds, ditches, and culverts. The device includes two mating jaws which are substantially rectangular in shape and include a plurality of mating cutting surfaces. The clearing apparatus is designed to cut standing trees and brush using both longitudinally and laterally oriented cutting surfaces. In the preferred embodiment, the first jaw includes a curved blade and a pair of cutting blocks, while the second jaw includes a pair of curved blades and a cutting block.

Each jaw has a pair of fixedly attached brackets which are used to pivotally mount the jaws to the boom structure of the hydraulic excavator. The jaws have a mutual pivoting point attached to the central boom of the excavator, and peripheral pivoting points movably attached to the control rams of the hydraulic cylinders. The hydraulic cylinders may be actuated to open and close the jaws in order to cut the debris into mulch. The jaws may be used to gather and remove the resulting mulch from drainage ditches by simply partially closing the jaws using enough force to grasp the mulch but not enough force to further cut the mulch.

Another advantage, which will be readily appreciated by those skilled in the art, is that changing over the excavator bucket to the clearing tool of this invention is extremely easy and fast. No additional or substitute hydraulic plumbing is required for proper attachment and operation of the instant invention. Thus, the changeover from bucket to attachment, or from attachment to bucket, can be done in just a few hours (or even minutes, if an on-the-market quick coupler is added to the instant invention), rather than a few days as is the case with prior art devices. In point of fact, the nuisance of changing a bucket for a brush clearer is so extreme that many times a brush clearer is simply left on the excavator. This is expensive, obviously, since the clearer attachment is used only part of the time; thus, an expensive machine is tied up and not available for excavating operations.

Accordingly, it is a principal object of the invention to provide a tree and brush clearing device capable of operating well on uneven broken ground.

It is another object of the invention to provide a clearing device capable of cutting the brush and trees into small pieces enabling the operator to leave a finished project that will not require further cleanup or fill drainage ditches with debris.

It is a further object of the invention to provide a clearing device that is efficient to operate and inexpensive to maintain and the cutting portion of the device should not be susceptible to damage by rocks or other hard objects.

Still another object of the invention is to provide a clearing device that gives the operator control of where to place the debris.

Still a further object of the invention is to provide a clearing device that is readily substituted for a bucket on an excavator, and readily changed back again for the bucket, thus avoiding a costly tieup of the excavator which otherwise will be assembled for one or the other uses only, it being excessively time-consuming to change prior art clearers for buckets and vice-versa.

It is an object of the invention to provide improved elements and arrangements thereof in a forestry cutting and mulching tool for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
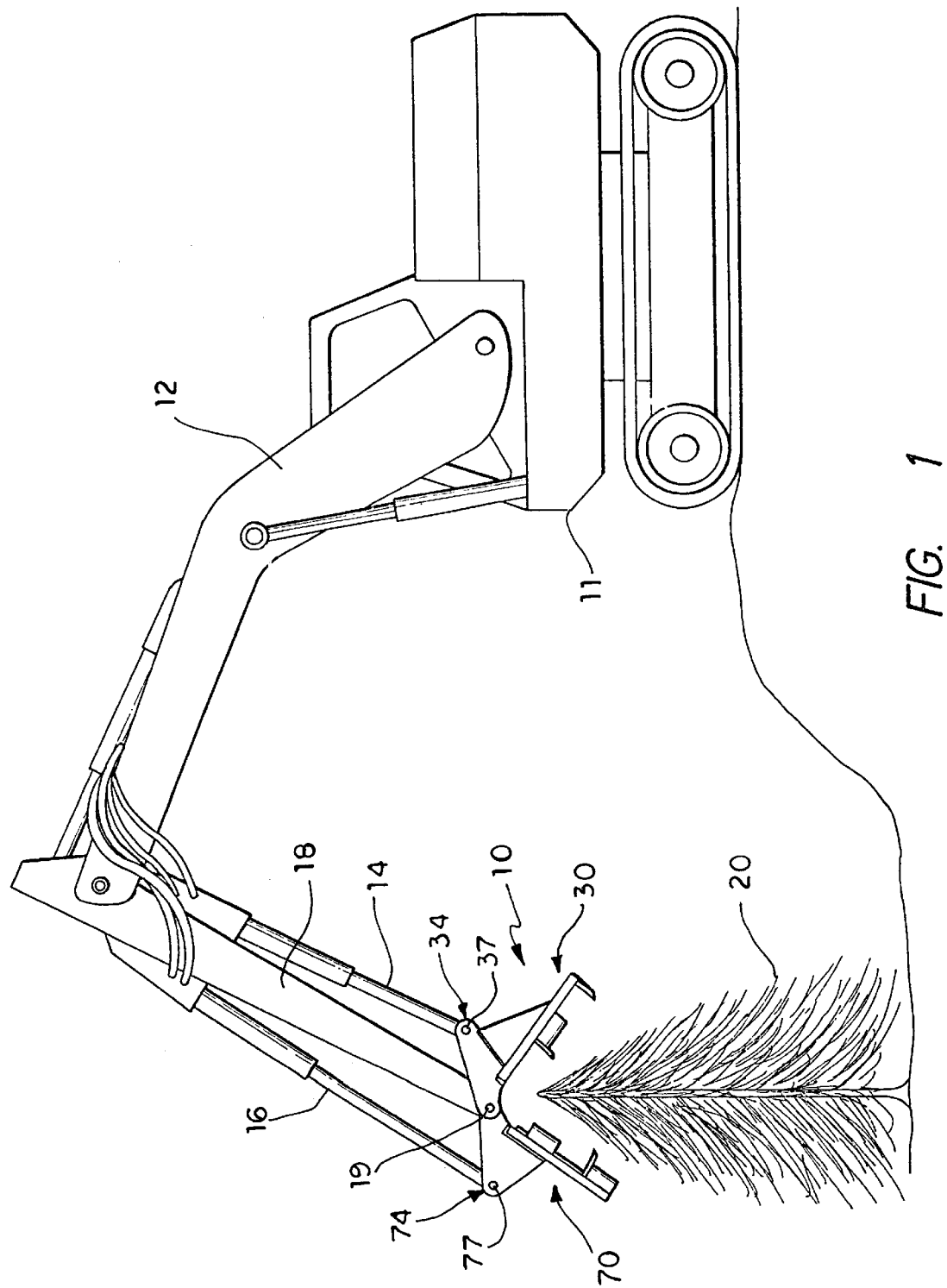
FIG. 1 is an environmental, perspective view of a forestry cutting, mulching, and clearing tool attached to a hydraulic excavator.

Referring to FIG. 1, the present invention 10 is a pair of mating jaws, 30 and 70, that are attached to a hydraulic excavator 11 and used for clearing sloped grounds, ditches, and culverts of trees 20 and brush. The present invention 10 is particularly useful for clearing small trees 20 and thick brush growing along the sides of roadways and train tracks in order to maintain the safety of such passageways. The small number of moving parts and the inherently strong structural design of the present invention 10 make the invention 10 economical to maintain.

Figure 3:
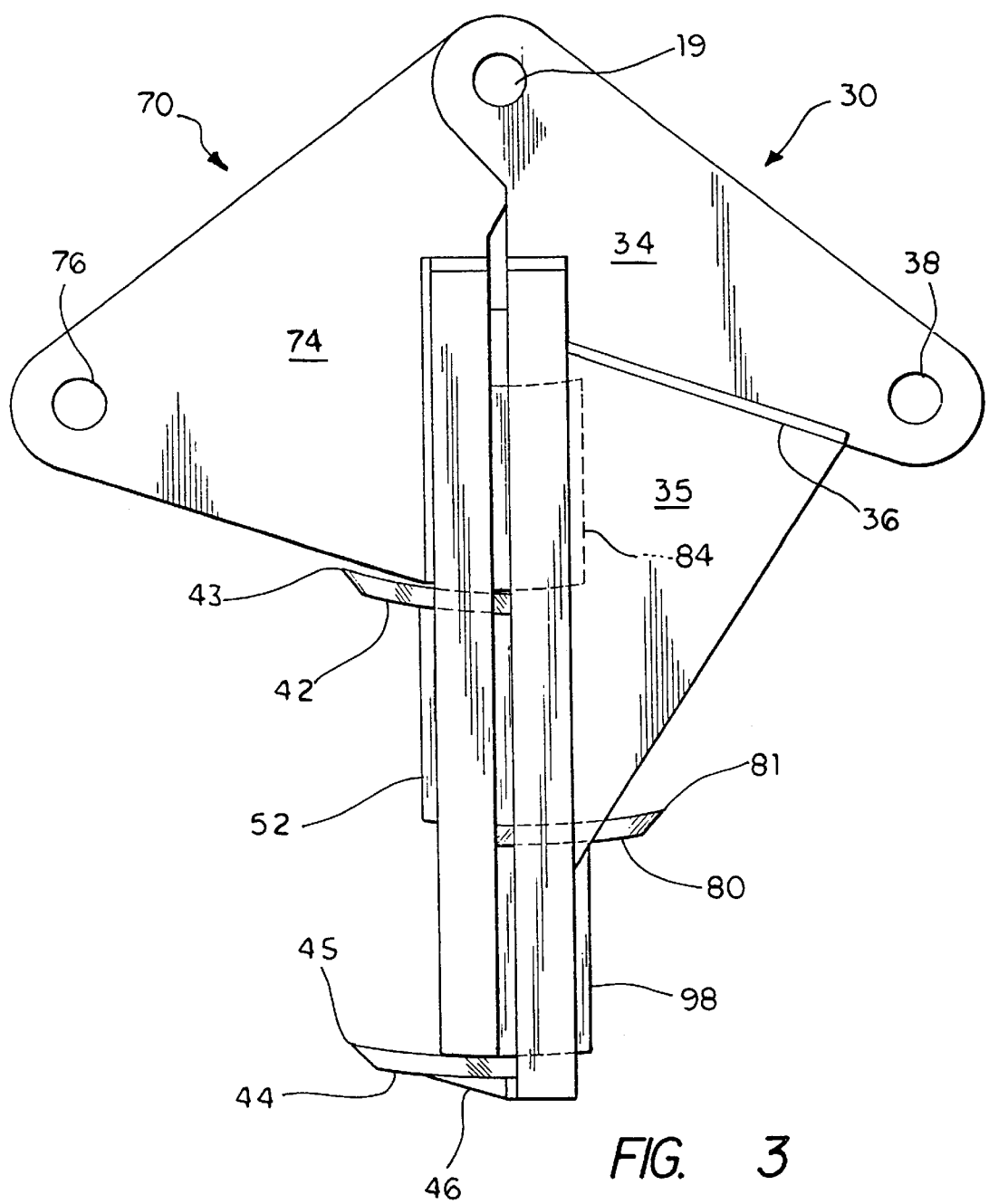
FIG. 3 is a side view showing the first and the second jaws in the closed position.
Figure 4:
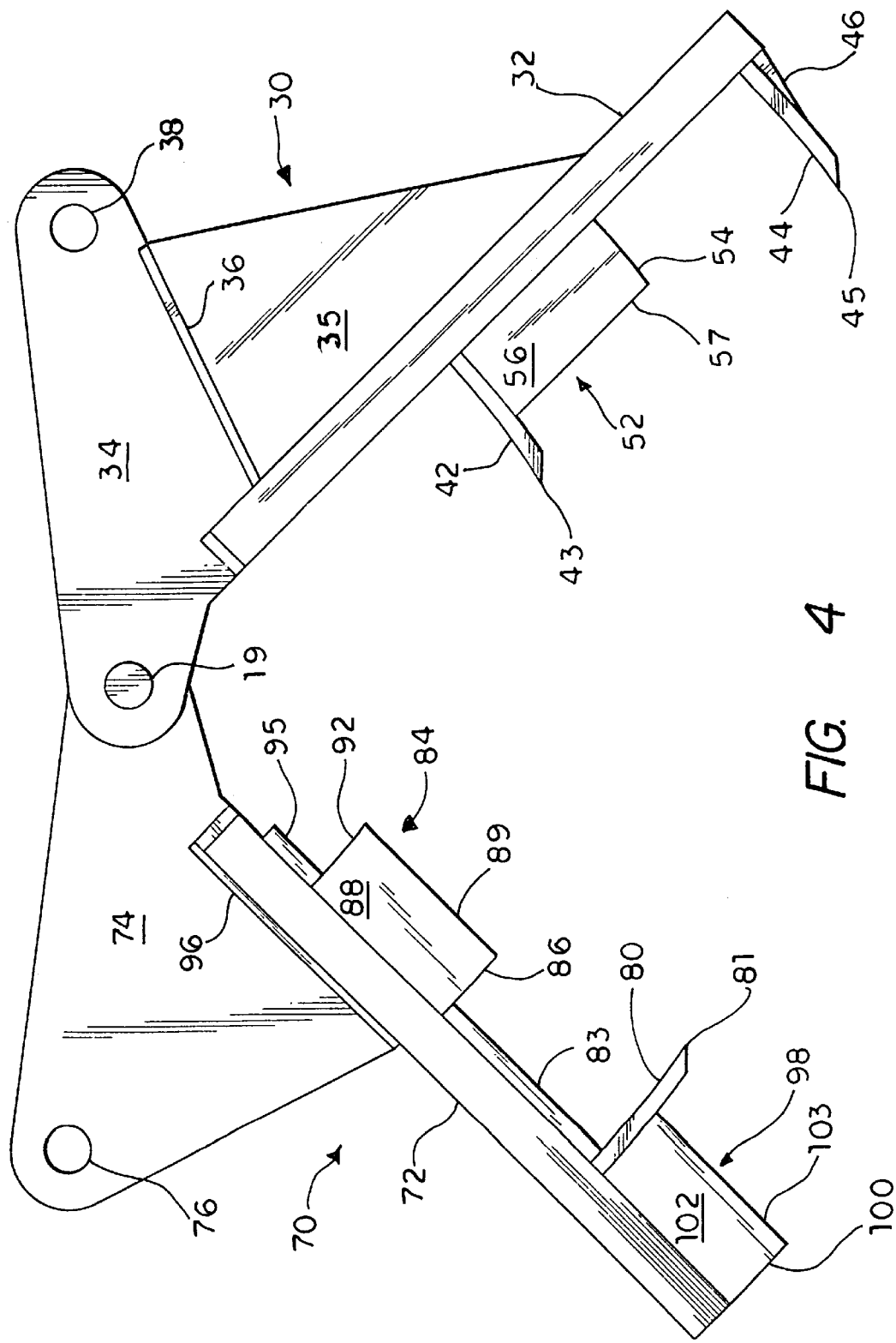
FIG. 4 is a side view showing the first and the second jaws in the open position.

As shown in FIG. 1, each jaw, 30 and 70, has a pair of fixedly attached brackets, 34 and 74 respectively, which are used to pivotally mount the jaws to the boom structure 12 of the hydraulic excavator 11. The jaws, 30 and 70, have a mutual pivoting point 19 attached to the central boom 18 of the excavator 11, and peripheral pivoting points, 37 and 77, movably attached to the control rams, 14 and 16, of the hydraulic cylinders. The hydraulic cylinders may be actuated to close and open the jaws, 30 and 70, as shown in FIGS. 3 and 4, in order to cut the debris into mulch. The jaws, 30 and 70, may also be used to gather and remove the resulting debris from drainage ditches by simply partially closing the jaws using enough force to grasp the debris but not enough force to further cut the debris.

Figure 2:
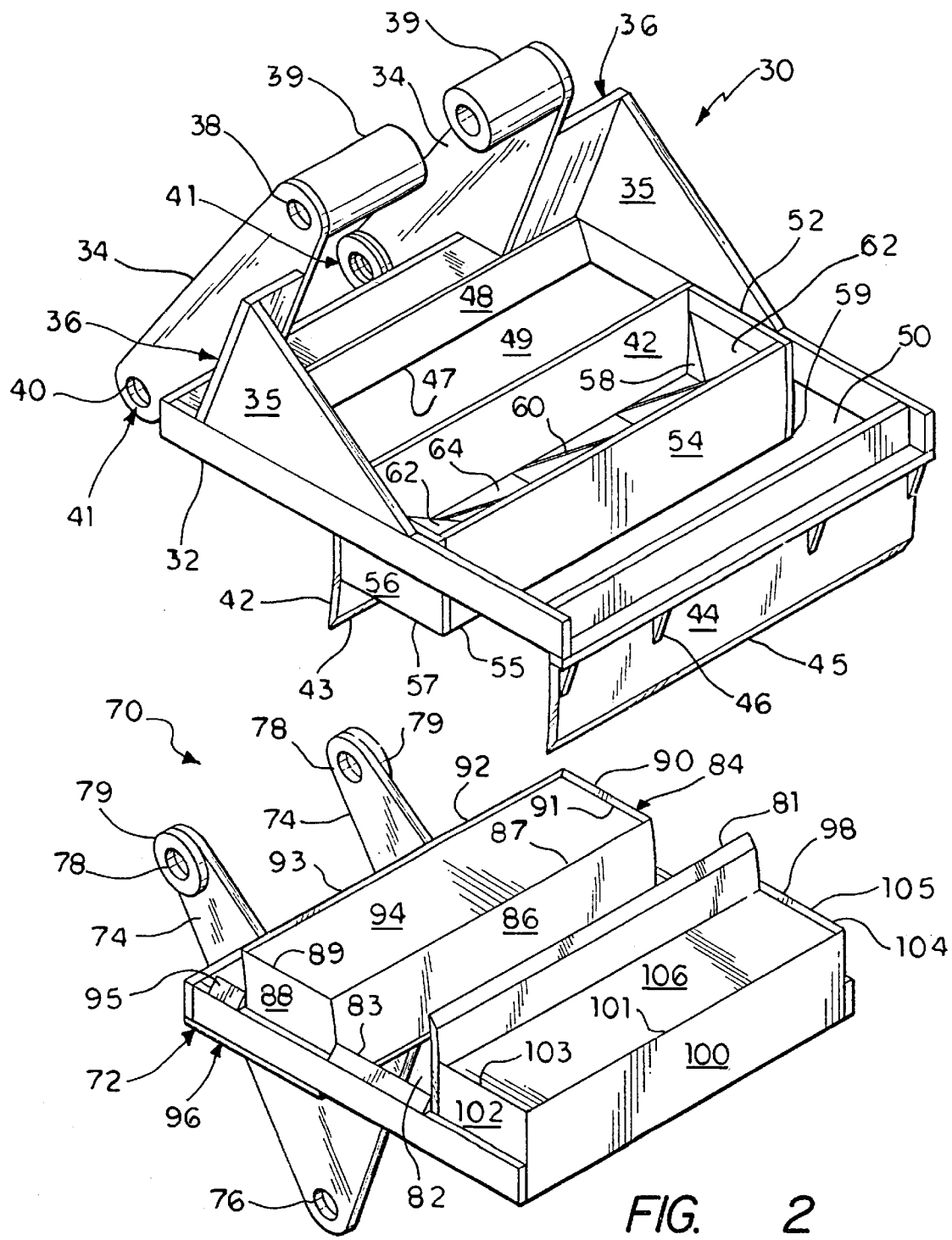
FIG. 2 is an exploded view showing both the first jaw and the second jaw in detail.

Referring now to FIG. 2, the preferred embodiment of the present invention 10 has a first jaw 30 that includes a first frame 32 that is substantially rectangular in shape and has a pair of fixedly attached first brackets 34. The first brackets 34 are rigidly mounted to the first frame 32 with the aid of a pair of first braces 35 and a pair of second braces 36. The first brackets 34 include a first hole 38 for pivotally attaching the first jaw 30 to the control ram 14 with pin 37 (see FIG. 1). Cylindrical spacers 39 may be rigidly attached to the brackets 34 adjacent first holes 38 in order to better attach the first jaw 30 to the control ram 14. The first brackets 34 also include a second hole 40 for pivotally attaching the first jaw to the central boom 18 with pin 19 (see FIG. 1). Cylindrical spacers 41 may be rigidly attached to the brackets 34 adjacent second holes 40 in order to better attach the first jaw 30 to the central boom 18. The distance between the brackets 34, the size of the brackets 34, the size of the braces, 35 and 36, and the size of the various cylindrical spacers, 39 and 41, can be determined by the manufacturer depending of the dimensions of the excavator 11 being used to control the present invention 10.

The first jaw 30 is a substantially rectangular shaped frame 32 with a plurality of longitudinally and laterally oriented cutting surfaces thereon which mate with cutting surfaces on the second jaw 70. In the preferred embodiment of the present invention the first jaw 30 includes two blades, 42 and 44, and a cutting punch 52. Blade 44 is rigidly mounted to the end of the frame 32 opposite the brackets 34. A plurality of buttresses 46 are rigidly attached to the blade 46 and the frame 32 in order to ensure the stability of the blade 44. The blade 44 is tapered at one end to form a sharp edge 45 which is adjacent to opening 50.

The first jaw 30 also includes blade 42 which is also rigidly mounted to the frame 32. Blade 42 is attached to the central portion of the frame 32 and is stabilized by the cutting punch 52, of which it is an integral part. The blade 42 is tapered at the end to form a sharp edge 43 which is adjacent to opening 49. The cutting punch 52 includes five sides, 42, 54, 56, 58, and 64. The cutting punch 52 further includes a plurality of triangular braces 60 which are rigidly attached to side 64 and side 54 in order to ensure the stability of the cutting punch 52. The cutting punch also includes a triangular brace 61 which is rigidly attached to sides 54 and 56, and a triangular brace 62 which is rigidly attached to sides 54 and 58. Side 64 is recessed slightly (similar to sides 94 and 106 on the second jaw 70) so that sides 54, 56, and 58 may be tapered to form sharp edges 55, 57, and 59, respectively. The sharp edges, 55, 57, and 59, correspond to sharp edges on the second jaw 70 and act as cutting surfaces when the first jaw 30 and the second jaw 70 are moved from the open position to the closed position.

The first jaw also includes surface 48 that is mounted to the frame 32 adjacent to opening 49. Surface 48 includes a sharp edge 47 which corresponds to sharp edges on the second jaw 70, and acts as a cutting surface when the first jaw 30 and the second jaw 70 are moved from the open position to the closed position.

Referring to FIG. 2, the preferred embodiment of the present invention 10 has a second jaw 70 that includes a second frame 72 that is substantially rectangular in shape and has a pair of fixedly attached second brackets 74. The second brackets 74 are rigidly mounted to the second frame 72 with the aid of a planar member 96 that is rigidly mounted to the frame 72. The second brackets 74 include a first hole 76 for pivotally attaching the second jaw 70 to the control ram 16 with pin 77 (see FIG. 1). Cylindrical spacers (not shown) may be rigidly attached to the brackets 74 adjacent first holes 76 in order to better attach the second jaw 70 to the control ram 16. The second brackets 74 also include a second hole 78 for pivotally attaching the second jaw to the central boom 18 with pin 19 (see FIG. 1). Cylindrical spacers 79 may be rigidly attached to the brackets 74 adjacent second holes 78 in order to better attach the second jaw 70 to the central boom 18. The distance between the brackets 74, the size of the brackets 74, and the size of the various cylindrical spacers can be determined by the manufacturer depending of the dimensions of the excavator 11 being used to control the present invention 10.

The second jaw 70 is a substantially rectangular shaped frame 72 with a plurality of longitudinally and laterally oriented cutting surfaces thereon which mate with cutting surfaces on the first jaw 30. In the preferred embodiment of the present invention the second jaw 70 includes one blade 80 and two cutting punches, 84 and 98. Blade 80 is rigidly mounted to the central portion of the frame 72 and is stabilized by cutting punch 98, of which it is an integral part. The blade 80 is tapered at the end to form a sharp edge 81 which is adjacent to opening 82.

In the preferred embodiment, cutting punch 98 is substantially identical to cutting punch 52 on the first jaw 30. Cutting punch 98 includes five sides, 100, 102, 104, 106, and 80. The cutting punch 98 further includes a plurality of triangular braces (not shown) that are substantially identical to the triangular braces, 60, 61, and 62, described for cutting punch 52. The plurality of triangular braces are designed to ensure the stability of the cutting punch 98. Side 106 is recessed slightly so that sides 100, 102, and 104 may be tapered to form sharp edges 101, 103, and 105, respectively. The sharp edges, 101, 103, and 105, correspond to edges on the first jaw 30 and act as cutting surfaces when the first jaw 30 and the second jaw 70 are moved from the open position to the closed position.

In the preferred embodiment, the second jaw 70 includes a second cutting punch 84. Cutting punch 84 includes five sides, 86, 88, 90, 92, and 94. The cutting punch 84 further includes a plurality of triangular braces (not shown) that are substantially identical to the triangular braces, 60, 61, and 62, described for cutting punch 52. The plurality of triangular braces are designed to ensure the stability of the cutting punch 84. Side 94 is recessed slightly so that sides 86, 88, 90, and 92 may be tapered to form sharp edges 87, 89, 91, and 93, respectively. The sharp edges, 87, 89, 91, and 93, correspond to edges on the first jaw 30 and act as cutting surfaces when the first jaw 30 and the second jaw 70 are moved from the open position to the closed position.

Note that in the preferred embodiment the second jaw 70 further includes a pair of edges 83 rigidly attached to the frame 72 adjacent to opening 82 and between cutting punch 84 and cutting punch 98. Similarly, a pair of edges 95 are rigidly attached to the frame 72 adjacent cutting punch 84. In an alternative embodiment, similar edges could be rigidly attached to the first jaw 30 adjacent to openings 49 and 50.

FIGS. 3 and 4 show the jaws in the closed position and in the open position, respectively. In the preferred embodiment of the present invention, when the first jaw 30 and the second jaw 70 are in the closed position as shown in FIG. 3, the corresponding cutting surfaces on the jaws abut one another. Cutting punch 84 on the second jaw 70 fits within opening 49 on the first jaw 30. Edges 87, 89, 91, and 93 on cutting punch 84 will slide over the edges on the first jaw 30 that surround opening 49 (including edge 43 of cutting blade 42 and edge 47), thereby shearing any objects present in between the corresponding edges. Similarly, cutting punch 52 on the first jaw 30 fits within opening 82 on the second jaw 70, and cutting punch 98 on the second jaw 70 fits within opening 50 on the first jaw 30.

In the preferred embodiment, as best seen in FIG. 3, sides 42 (also acts as a blade), 44, 48 and 54, of the first jaw 30 are arcuate in shape with a radius equal to the distance between that particular side and the axis of pin 19. Sides 56 and 58 and triangular braces 60 of the cutting punch 52 are shaped to sit flush with sides 42 and 54. Similarly, sides 80, 86, 92, and 100 of the second jaw 70 are arcuate in shape with a radius equal to the distance between that particular side and the axis of pin 19. Sides 88 and 90 and triangular braces (not shown) of the cutting punch 84 are shaped to sit flush with sides 86 and 92, and sides 102 and 104 and triangular braces (not shown) of the cutting punch 98 are shaped to sit flush with sides 80 and 100. The arcuate shape allows the corresponding mating sides of the first jaw 30 and the second jaw 70 to side flush with one another when the jaws are in the closed position.

In the preferred embodiment all of the parts of the present invention are constructed of steel and all of the parts are joined together by welding along the seams. Other suitable materials and joining processes may be utilized by the manufacturer, taking into account strength and durability requirements of the invention.

It should be noted that the preferred embodiment of the present invention cuts trees and brush in both a longitudinal and a lateral direction using numerous cutting surfaces. The present invention is capable of cutting the trees and brush into small pieces which may either be left at the worksite as mulch, or gathered and disposed of at a remote location.

Furthermore, the preferred embodiment cuts the trees and brush in several stages rather than all at once which reduces the stresses placed on the excavator 11 and the jaws, 30 and 70. As the first jaw 30 and the second jaw 70 move towards each another, the edge 43 of blade 42 will pass the edge 87 of cutting punch 84, thereby making the first cut. As the first jaw 30 and the second jaw 70 move further towards the closed position, edge 81 of blade 80 and edge 55 of cutting punch 52 will make a cut, and finally edge 45 of blade 44 and edge 101 of cutting punch 98 will make a cut. Interspersed between and after the cuts made by the blades, 42, 80, and 44, are the cuts made by the cutting punches, 84, 52, and 98, sliding within their respective openings, 49, 82, and 50.

The height or size of both the blades, 42, 44, and 80, and the cutting punches, 52, 84, and 98, may be varied in order to change the timing and distribution of cuts made by them during the closing of the jaws, 30 and 70. Alternatively or in addition to changing the height, the location of the blades 42, 44, and 80, and the cutting punches, 52, 84, and 98, on the frames, 32 and 72, may be varied in order to change the timing and distribution of cuts made by them during the closing of the jaws, 30 and 70. In addition, changing the shape of the brackets, 34 and 74, and the location of the holes, 40 and 78, in relation to the frames, 32 and 72, will change the timing and distribution of cuts made by the blades and the cutting punches during the closing of the jaws.

It is to be understood that the present invention is not limited to the embodiments described above, but encompasses any and all embodiments within the scope of the following claims.

I claim:

1. A forestry cutting, mulching, and clearing tool comprising:
   a first frame including:
     a first blade having a first end and a second end, said first end being rigidly attached to said first frame, said second end having an edge,
     a first punch rigidly attached to said first frame, and
     a first punch frame defining a first opening; and
   a second frame pivotally connected to said first frame, said second frame including:
     a second blade having a first end and a second end, said first end being rigidly attached to said second frame, said second end having an edge, said second blade cooperating with said first punch,
     a second punch rigidly attached to said second frame, said second punch cooperating with said first opening, and
     a second punch frame defining a second opening, said first punch cooperating with said second opening.

2. The forestry cutting, mulching, and clearing tool according to claim 1 wherein:
   said first punch has a first end and a second end, said first end being attached to said first frame, said second end having an edge; and
   said second punch has a first end and a second end, said first end being attached to said second frame, said second end having an edge.

3. The forestry cutting, mulching, and clearing tool according to claim 2 wherein said first punch and said second punch each include:
   four side members each extending from said first end to said second end thereof, said side members forming a substantially rectangular shape, said second ends of each of said side members having an edge thereon; and
   an end member attached to said four side members proximate to said second ends thereof.

4. The forestry cutting, mulching, and clearing tool according to claim 1 wherein:
   said first blade extends further from said first frame then said first punch; and
   said second blade extends further from said second frame then said second punch.

5. The forestry cutting, mulching, and clearing tool according to claim 1 wherein:
   said first blade, said second blade, said first punch, said second punch, said first punch frame, and said second punch frame have arcuate surfaces thereon, said arcuate surfaces each being an arc of a constant radius extending from said pivotal connection of said first jaw and said second jaw.

6. The forestry cutting, mulching, and clearing tool according to claim 1 wherein:
   said first frame includes a first pair of brackets each having a first hole and a second hole;
   said second frame includes a second pair of brackets each having a first hole and a second hole; and
   said tool includes a rod extending through said first holes on said first pair of brackets and said first holes on said second pair of brackets.

7. The forestry cutting, mulching, and clearing tool according to claim 6 wherein said tool further includes a pair of braces rigidly attached between said first pair of brackets and said first frame.

8. The forestry cutting, mulching, and clearing tool according to claim 1 further comprising means for forcing said first frame and said second frame into a mating relationship and retracting said first frame and said second frame therefrom.

9. The forestry cutting, mulching, and clearing tool according to claim 8 wherein said means for forcing said first frame and said second frame into a mating relationship and retracting said first frame and said second frame therefrom is a hydraulic excavator.

10. The forestry cutting, mulching, and clearing tool according to claim 9 wherein said hydraulic excavator includes:
    a hydraulically operated boom structure, said boom structure being pivotally connected to said first hole of said first frame and being pivotally connected to said first hole of said second frame;
    a first hydraulically operated rod connected to said boom structure and having a terminal end, said terminal end of said first rod being pivotally connected to said second hole of said first frame; and
    a second hydraulically operated rod connected to said boom structure and having a terminal end, said terminal end of said second rod being pivotally connected to said second hole of said second frame.

11. The forestry cutting, mulching, and clearing tool according to claim 1 wherein said tool is constructed of a rigid material.

12. The forestry cutting, mulching, and clearing tool according to claim 1 wherein said tool is constructed of steel.

13. The forestry cutting, mulching, and clearing tool according to claim 1 wherein said second punch frame has an edge thereon, said second punch frame edge cooperating with said first punch.

14. The forestry cutting, mulching, and clearing tool according to claim 1 wherein:

said first frame further includes a third blade having a first end and a second end, said first end being rigidly attached to said first frame, said second end having an edge;

said second frame further includes a third punch rigidly attached to said second frame, said third blade cooperating with said third punch; and said first frame further includes a third punch frame defining a third opening, said third punch cooperating with said third punch.

15. The forestry cutting, mulching, and clearing tool according to claim 14 wherein said third punch has a first end and a second end, said first end being attached to said second frame, said second end having an edge.

16. The forestry cutting, mulching, and clearing tool according to claim 15 wherein said third punch includes:

four side members each extending from said first end to said second end thereof, said side members forming a substantially rectangular shape, said second ends of each of said side members having an edge thereon; and an end member attached to said four side members proximate to said second ends thereof.

17. The forestry cutting, mulching, and clearing tool according to claim 14 wherein:

said third blade extends further from said first frame than said first punch; and said second blade extends further from said second frame than said third punch.

18. The forestry cutting, mulching, and clearing tool according to claim 14 wherein:

said third blade, said third punch, and said third punch frame have arcuate surfaces thereon, said arcuate surfaces each being an arc of a constant radius extending from said pivotal connection of said first jaw and said second jaw.

19. The forestry cutting, mulching, and clearing tool according to claim 14 wherein said tool is constructed of a rigid material.

20. The forestry cutting, mulching, and clearing tool according to claim 14 wherein said tool is constructed of steel.

* * * * *